US010104873B2

(12) United States Patent
Elferink et al.

(10) Patent No.: US 10,104,873 B2
(45) Date of Patent: *Oct. 23, 2018

(54) EGG PRINTING SYSTEM AND METHOD (71) Applicant: SANOVO TECHNOLOGY NETHERLANDS B.V., Aalten (NL)

(72) Inventors: Hendrik Elferink, Aalten (NL); Jan Hordijk, Aalten (NL)

(73) Assignee: Sanovo Technology Netherlands B.V., Aalten (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/544,200

(22) PCT Filed: Jan. 12, 2016

(86) PCT No.: PCT/NL2016/050024
§ 371 (c)(1),
(2) Date: Jul. 17, 2017

(87) PCT Pub. No.: WO2016/118003
PCT Pub. Date: Jul. 28, 2016

(65) Prior Publication Data
US 2018/0007871 A1    Jan. 11, 2018

(30) Foreign Application Priority Data

Jan. 19, 2015  (NL) ..................................... 2014156
Jan. 19, 2015  (NL) ..................................... 2014157

(51) Int. Cl.
*A01K 43/10*    (2006.01)
*B41J 3/407*    (2006.01)
(Continued)

(52) U.S. Cl.
CPC .............. *A01K 43/10* (2013.01); *B41F 17/30* (2013.01); *B41J 3/4073* (2013.01); *B65B 23/06* (2013.01);
(Continued)

(58) Field of Classification Search
CPC ......... A03K 43/00; A03K 43/10; B41F 17/13; B41J 3/4073; B65B 23/06; B65B 63/005; B65G 17/06; B65G 17/12; B65G 65/02
See application file for complete search history.

(56) References Cited

U.S. PATENT DOCUMENTS 3,297,139 A    1/1967  Speigle
3,820,301 A *  6/1974  Wilsey .................... B65B 23/02
                                               198/399

(Continued)

FOREIGN PATENT DOCUMENTS

DE    20 2004 008 244    8/2004
EP    0 560 458          9/1993
JP    11301608         * 11/1999 ............. B65B 23/06

OTHER PUBLICATIONS

International Search Report for PCT/NL2016/050024 dated May 6, 2016.
Written Opinion for PCT/NL2016/050024 dated May 6, 2016.

*Primary Examiner* — Matthew G Marini
*Assistant Examiner* — Marissa Ferguson Samreth
(74) *Attorney, Agent, or Firm* — Nixon Peabody LLP; Jeffrey L. Costellia (57) ABSTRACT

An egg printing system comprises a printer (30, 31, 32) and an endless egg conveyor (1) that is adapted to move the eggs (50) past the printer. The conveyor including an endless element running around a set of rotational wheels and a drive unit defining a conveying direction of the conveyor. The egg conveyor includes a lane of egg retaining pockets (10) coupled to the endless element, said lane of retaining pock-
(Continued)

ets in use moving in the conveying direction. Each retaining pocket has a central axis and an upper receiving opening to receive an egg with a longitudinal axis of the egg generally aligned with said central axis of the pocket. The pocket has a side opening at a side thereof facing in the conveying direction and/or in the opposite direction, leaving a side surface area exposed of the egg that is received in the pocket. The retaining pockets remain in an upright position in every position in the lane. The printer is positioned at one of the head sections of the conveyor with a printing head facing the corresponding lane being directed to said side opening in the pocket to allow printing on said side surface area of the egg.

18 Claims, 6 Drawing Sheets

(51) Int. Cl.
| | | |
|---|---|---|
| | *B41J 17/30* | (2006.01) |
| | *B41F 17/30* | (2006.01) |
| | *B65B 63/00* | (2006.01) |
| | *B65B 23/06* | (2006.01) |
| | *B65G 17/12* | (2006.01) |
| | *B65B 65/02* | (2006.01) |
| | *B65G 17/06* | (2006.01) |

(52) U.S. Cl.
CPC ............ *B65B 63/005* (2013.01); *B65B 65/02* (2013.01); *B65G 17/06* (2013.01); *B65G 17/12* (2013.01)

(56) References Cited

U.S. PATENT DOCUMENTS

| | | | | | |
|---|---|---|---|---|---|
| 4,465,225 | A | * | 8/1984 | Bixler | B65D 85/32 206/521.1 |
| 4,672,892 | A | * | 6/1987 | Ackley | B41F 17/36 101/35 |
| 4,843,958 | A | | 7/1989 | Egosi | |
| 4,905,589 | A | * | 3/1990 | Ackley | A61J 3/007 101/35 |
| 5,630,499 | A | * | 5/1997 | Louden | B65G 17/34 198/465.1 |
| 6,314,876 | B1 | * | 11/2001 | Ackley | A61J 3/007 101/44 |
| 6,343,688 | B1 | * | 2/2002 | McKinlay | A01K 31/165 119/337 |
| 6,390,280 | B1 | * | 5/2002 | Boyce | B41F 17/36 198/530 |
| 7,946,413 | B2 | * | 5/2011 | Hordijk | B65G 17/32 198/397.01 |
| 9,199,795 | B2 | * | 12/2015 | Bliss | B65B 23/08 |
| 9,434,556 | B2 | * | 9/2016 | Wikkerink | B65B 23/06 |
| 2004/0094050 | A1 | * | 5/2004 | Ackley, Jr. | B23K 26/0838 101/44 |

* cited by examiner

Fig. 7

EGG PRINTING SYSTEM AND METHOD

FIELD OF THE INVENTION

The invention relates to an egg printing system comprising at least one printer having a printing head and an endless egg conveyor that is adapted to move the eggs past the printer, the egg conveyor including at least one endless element running around a set of rotational wheels rotating around respective rotational axes and a drive unit defining a conveying direction of the conveyor, said egg conveyor having an upper run and a lower run and head sections where the direction of movement of the endless element between the upper run and the lower run is reversed over one or more of said rotational wheels.

BACKGROUND OF THE INVENTION

DE 20 2004 008 244 U1 discloses a system which has an endless conveyor having lanes with rotatable rollers. The eggs are each supported by two consecutive rollers and lay with their longitudinal axis substantially horizontal. The eggs rotate during movement of the conveyor. Above each lane an inkjet printer is positioned to print characters on the eggs.

The present invention has for an object to provide an alternative egg printing system.

SUMMARY OF THE INVENTION

This object is achieved by an egg printing system comprising at least one printer having a printing head and an endless egg conveyor that is adapted to move the eggs past the printer, the egg conveyor including at least one endless element running around a set of rotational wheels rotating around respective rotational axes and a drive unit defining a conveying direction of the conveyor, said egg conveyor having an upper run and a lower run and head sections where the direction of movement of the endless element between the upper run and the lower run is reversed over one or more of said rotational wheels,

- wherein the egg conveyor furthermore includes at least one lane of egg retaining pockets coupled to the endless element, said lane of retaining pockets in use moving in the conveying direction, each of said retaining pockets having a central axis and an upper receiving opening to receive an egg with a longitudinal axis of the egg generally aligned with said central axis of the pocket, said pocket having a side opening at a side thereof facing in the conveying direction and/or in the opposite direction, leaving a side surface area exposed of the egg that is received in the pocket,
- wherein the retaining pockets are each coupled to the endless element by a bearing structure allowing rotation of the retaining pocket around a rotational axis that extends parallel to the rotational axes of said rotational wheels, allowing the retaining pockets to remain in an upright position in every position in the lane, and
- wherein the printer is positioned at one of the head sections of the conveyor with a printing head facing the corresponding lane being directed to said side opening in the pocket to allow printing on said side surface area of the egg.

The system according to the invention thus includes a conveyor comprising egg retaining pockets in which the eggs can be held in an upright manner, that is with the longitudinal axis approximately vertical. Such an arrangement provides an advantage with respect to the use of space at an egg handling site where the eggs are, for instance, graded, sorted and packed. The capacity in terms of numbers of eggs to be handled per time unit versus the use of space can be higher when eggs are held in an upright position.

Advantageously the system according to the invention provides the possibility to print on the eggs in the longitudinal direction or at the upper end of the egg, while at the same time the closest packing of the eggs in the length direction of the conveyor is maintained. This possibility is provided by having a lane of egg retaining pockets with an openwork design, as described in the above, in combination with the feature that the pockets are maintained in an upright position during the entire circuit of the conveyor, whereby at the head ends of the conveyor, where the rotational wheels are present, successive pockets of one lane will move apart in a vertical direction, comparable to a paternoster system. Thus each pocket at the head section of the conveyor faces the printer head without being obstructed by the previous pocket in the lane.

Another advantage is that in the system according to the invention the eggs move vertically past the printing head with their longitudinal axis oriented vertically, whereby a good printing quality can be achieved, especially if an inkjet printer is used.

The conveyor may have a single lane, but generally an endless conveyor as described will have multiple lanes. In a system with multiple lanes, in particular with more than two lanes, the advantage of the system of the present invention particularly comes forward. This is because, whilst the two outer lanes could eventually be reached by a printer located at the lateral side of the conveyor, in a fashion as for example shown in DE 101 09 109, lanes that are located between the outer two lanes cannot be reached by a printer from the lateral side of the conveyor. In DE 20 2004 008 244 U1 is disclosed that a printer is located above each lane, but there the eggs have to be positioned horizontally, if a print has to be applied in the longitudinal direction of the egg.

In a possible embodiment of the egg printing system, in case of a conveyor with a single lane, the retaining pocket of said lane, or, in case of a conveyor with multiple lanes, the adjacent retaining pockets of the different lanes define a pocket row, the conveyor comprises carrying elements that carry the pocket(s) of one row, and, in case of multiple lanes, the multiple pockets in a pocket row are rigidly connected to each other by the carrying element.

In a further embodiment of the system according to the invention the bearing structure of each pocket row comprises a support arm on either lateral side of the conveyor, said support arm being positioned upright with respect to the circulating endless element and rigidly connected thereto, and wherein the bearing structure of said pocket row furthermore comprises at least one spindle rigidly connected to the carrying element which pivotally connects the carrying element to the support arms. This structure has the effect that at the upper and lower run of the conveyor, the space between pockets of a lane can be made small, while at the head portions of the conveyor the space between the pockets is increased, such that the pockets can make the turn. The support arms are shaped and dimensioned such that successive pockets of one lane will move apart in a vertical direction, comparable to a paternoster system, whereby each pocket at the head section of the conveyor faces the printer head without being obstructed by the previous pocket in the lane.

In a further embodiment of the system each carrying element is coupled to a guiding element, and a stationary guiding track is provided adapted to cooperate with the guiding element so as to maintain the retaining pockets carried by the carrying element in the upright position during the entire circulation of the conveyor. In this way the retaining pockets are actively held upright whereby it is ensured that the egg retaining pockets are not rocking or tipping over during their circulation which can have a negative effect on the quality of the print applied on the egg.

In a preferred embodiment the stationary guiding track comprises successive guiding track sections including at least a rectilinear guiding track section parallel to the upper run of the conveyor and at least one curved guiding track section parallel to the endless element at the corresponding head end.

In a further possible embodiment the guiding element may comprises an angled lever arm and guiding rolls which are arranged on the respective ends of the angled lever arm, and wherein said rotational spindle is fixed to the angled lever arm at the angle portion of the angled lever arm. Possibly the curved guiding track section comprises a first curved guiding surface running parallel to the endless element at the head end, which is engaged by one of said guiding rolls and a successive second curved guiding surface running parallel to the endless element at the head end, which is engaged by the other one of said guiding rolls.

In such an embodiment the guiding structure thus comprises successive guiding track sections, wherein the rectilinear section is engaged by two guiding rolls, the first curved guiding surface by one of the guiding rolls and the second curved guiding surface by the other guiding roll on the angled lever arm. In this way it is ensured that the egg retaining pockets are not rocking or tipping over during their circulation.

In a preferred embodiment the at least one endless element runs over one rotational wheel at each of the respective head sections. The rotational wheel has a large enough diameter such that the retaining pockets can move away from each other sufficiently and do not block each other when facing the printer.

Preferably the upper run and lower run are parallel.

Furthermore the upper run and, preferably also the lower run, is horizontal.

In a preferred embodiment the endless element is a chain and the rotational wheel is a sprocket wheel. Preferably the conveyor has a chain on either lateral side which runs around corresponding sprockets at either head section.

In a preferred embodiment of the system according to the invention the printer is an inkjet printer having an inkjet printing head.

In a further embodiment of the invention the egg retaining pocket comprises moveable fingers to engage the egg, which can be moved between a retaining position, in which the egg is retained in the pocket, and an releasing position, in which the egg is released from a lower end of the pocket. Eggs can be received in the pocket from above through the egg receiving opening. By moving the moveable fingers apart the egg can be released from a release opening at a lower end of the pocket. The egg can for example be released on a successive conveyor or in a packaging tray or box.

Preferably the egg retaining pocket comprises elastic elements for engaging the egg, said elastic elements being elastically deformable so as to adapt to its shape to shape and size of the egg and provide lateral support to the egg. The elastic elements provide cushioning of the egg when it is dropped from above into the pocket, whereby the risk of damaging of the egg is reduced. Furthermore the elastic elements provide additional support to the egg, especially lateral support, to keep the egg stable in the pocket, which reduces the risk of damaging of the egg. A stable positioning of the egg also has a positive effect on the printing quality on the egg.

In a particular embodiment the elastic elements are elastic strips which are arranged on an inner side of the respective fingers, wherein an upper end and a lower end of each elastic strip is fixed to the respective finger, and wherein the strip between said upper end and lower end are spaced apart from said inner side of the finger. Advantageously the elastic strips automatically adapt their shape to the shape and size of the egg such that every egg is sufficiently supported laterally to keep it stable in the pocket.

The features according to the above mentioned aspect relating to the retaining pocket are also usable in an endless conveyor which is not used in an egg printing system.

The invention also relates to an egg printing method making use of a system as described in the above, wherein eggs having a rounded end and a pointed end are placed with said pointed end down in the pockets, and wherein characters or figures are printed on the side surface area of the egg. The orientation with the pointed end of the egg downwards provides advantages with regard to further processing of the eggs, for example packing of the eggs.

Advantageously there may be provided a second printer having a printing head which is positioned above one of the horizontal sections of the conveyor, and characters or figures are printed on the rounded end of the eggs.

The invention will be further elucidated in the detailed description with reference to the drawings.

DETAILED DESCRIPTION

Figures 1, 2:
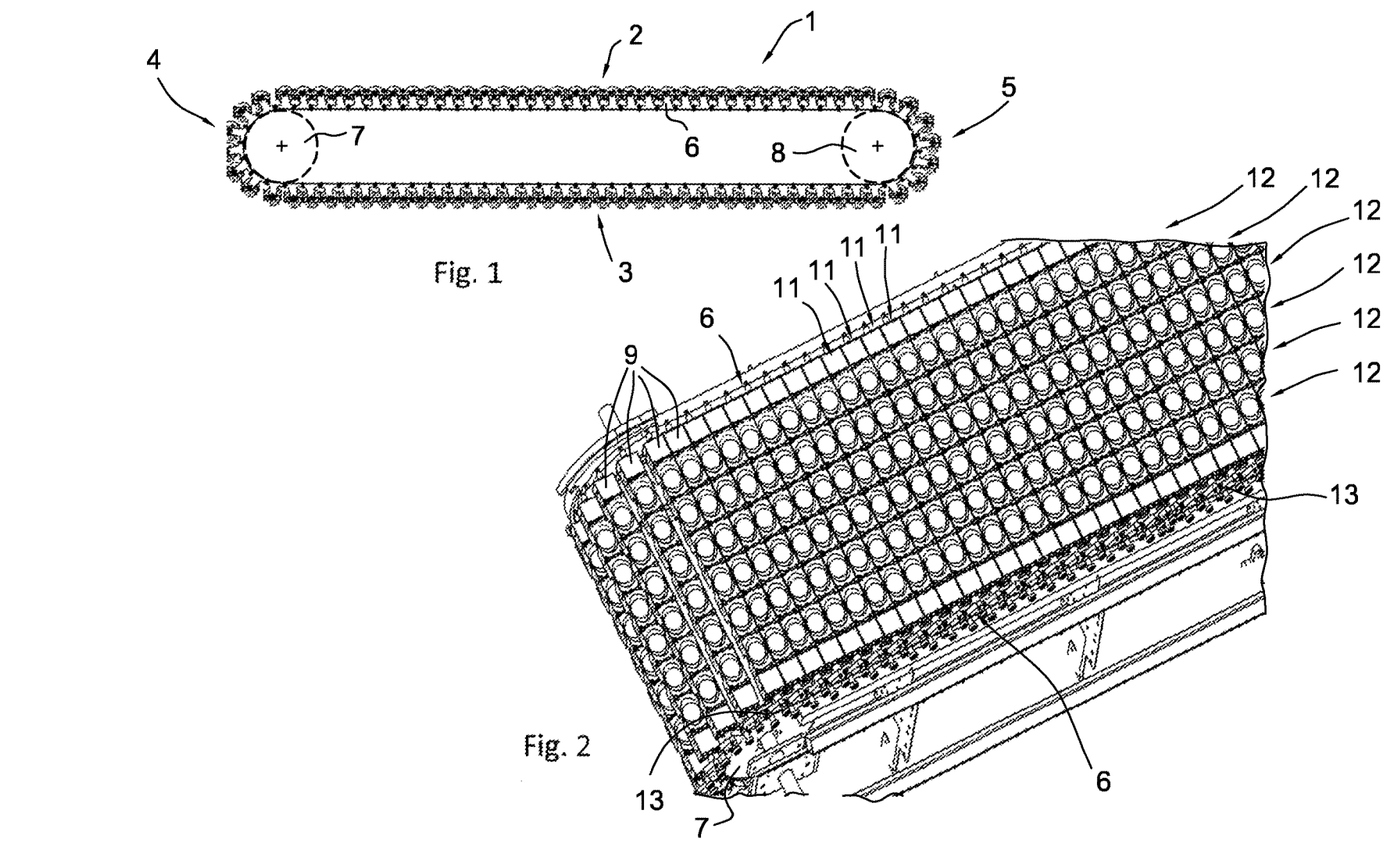
FIG. 1 shows a side view of a conveyor of an egg printing system according to the invention.
FIG. 2 shows a view in perspective from above on a part of the conveyor of FIG. 1.

FIG. 1 shows an endless conveyor 1 having an upper run 2 and a lower run 3 and head sections 4 and 5. The upper run 2 and the lower run 3 are parallel in this specific embodiment.

As can be seen in FIGS. 1-7, the endless conveyor 1 includes a chain 6 at either lateral side. The chain 6 runs around a corresponding sprocket 7, 8 at either of the head sections 4, 5. The chains 6 are driven by a drive motor that is coupled to the sprockets 7 or 8 associated with the chains. The other of the sprockets 7, 8 may be an idle sprocket.

The conveyor comprises carrying elements 9 extending in a transverse direction between the chains 6. Each carrying element 9 carries a number of egg receiving pockets 10, which form a pocket row 11 of the conveyor. In the example shown in the figures, each pocket row has six pockets 10, but it is to be understood that another number of pockets 10 per row 11 is possible.

Corresponding pockets 10 of successive rows 11 constitute lanes 12 of the conveyor 1 as is indicated in FIG. 2. Thus in the example shown the conveyor 1 has six lanes 12.

In FIGS. 8-12 is shown a detail of a carrying element 9 of the conveyor 1. The carrying element 9 comprises a number of egg retaining pockets 10. Each pocket 10 has a pair of opposite fingers 101 which are pivotably connected to the carrying element 9 by means of a pivot 102. The fingers 101 of one pocket 10 can pivot away from each other to open the pocket 10 so as to release an egg 50 at an underside of the pocket 10 for example into an egg transferring device or into a packaging tray or box. This opening of the pocket is actuated by a pocket actuator (not shown).

The fingers 101 of the pocket 10 are provided with elastic strips 103 that extend from an upper end of the pocket 10 towards a lower end. The elastic strips 103 are advantageously made of a plastics or elastomer material, but may also be of for example metal, e.g. spring steel. Each of the fingers 101 of the pocket 10 has two elastic strips 103 which at a lower end 103B thereof are interconnected, and connected to the associated finger 101. At an upper end 103A the elastic strips 103 are connected to the finger 101. The elastic strips 103 in the portion between the upper end 103A and lower end 103B in an unloaded state have such a (curved) shape that they are spaced apart from the surface of the associated finger 101.

Each of the retaining pockets 10 has a central axis 106 and an upper receiving opening 104 to receive an egg 50 with a longitudinal axis of the egg 50 generally aligned with said central axis 106 of the pocket 10. The four elastic strips 103 keep the eggs 50 stable in the pocket 10. Moreover the elastic strips 103 cushion the eggs 50 falling in the pocket 10 from above when the eggs 50 are loaded on the conveyor 1.

The pocket 10 has a side opening 105 at a side thereof facing in the conveying direction and in the opposite direction, leaving a side surface area 51 of the egg 50 exposed.

The retaining pockets 10 are each coupled to the chain 6 by a bearing structure allowing rotation of the retaining pockets 10 around a rotational axis that extends parallel to the rotational axes of said sprockets 7, 8. The bearing structure allows the retaining pockets 10 to remain in an upright position in every position in the lane as is, amongst others, visible in FIGS. 1, 2 4, 5.

The bearing structure of each pocket row 11 comprises a support arm 13 on either lateral side of the conveyor 1. The support arm 13 is positioned upright with respect to the circulating chain 6 and rigidly connected to a chain link 61. In particular the support arm 13 extends perpendicular to the direction of movement of the corresponding link 61 of the chain 6. The bearing structure of said pocket row 11 furthermore comprises at least one rotational spindle 17 rigidly connected to the carrying element 9 which pivotally connects the carrying element 9 to the support arms 13.

Each carrying element 9 is coupled to a guiding element 18. The guiding element 18 comprises an angled lever arm 19 and guiding rolls 20 and 21 respectively, which are arranged on the respective ends 19B, 19C of the angled lever arm 19. The rotational spindle 17 is fixed to the angled lever arm 19 at the angle portion 19A of the angled lever arm 19.

A stationary guiding track 23 is provided at each of the head end sections 4 and 5. The stationary guiding track 23 is adapted to cooperate with the guiding element 18 so as to maintain the retaining pockets 10 carried by the carrying element 9 in the upright position during the entire circulation of the conveyor 1.

Figures 5, 6:
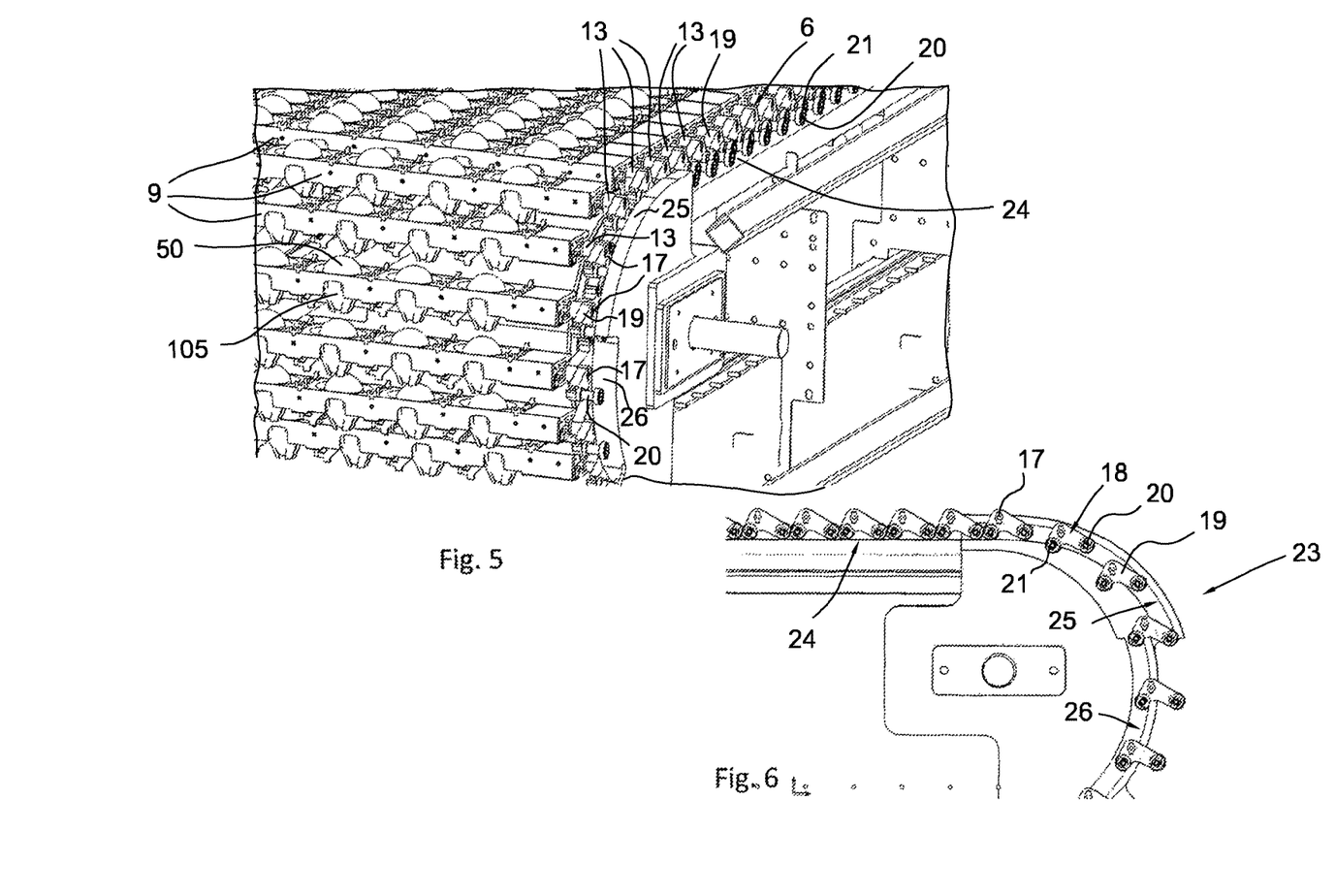
FIG. 5 shows another view in perspective on a part of the conveyor of FIG. 1 at the head section.
FIG. 6 shows a longitudinal section of the head section of the conveyor shown in FIG. 5.
Figure 7:
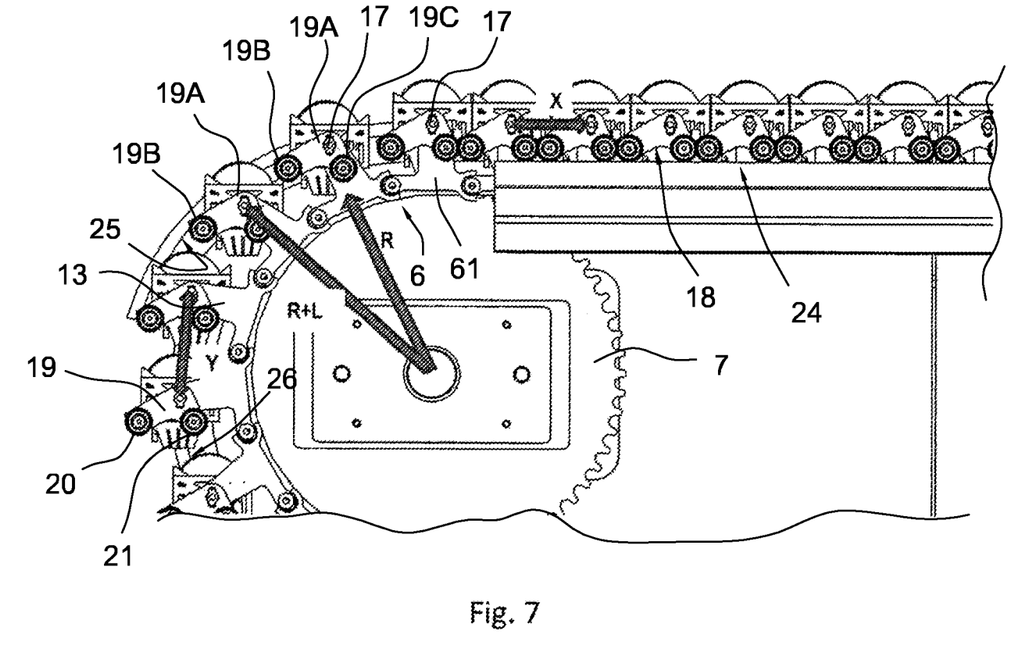
FIG. 7 shows a partially cutaway view of the head section of FIG. 5.
Figures 8, 9:
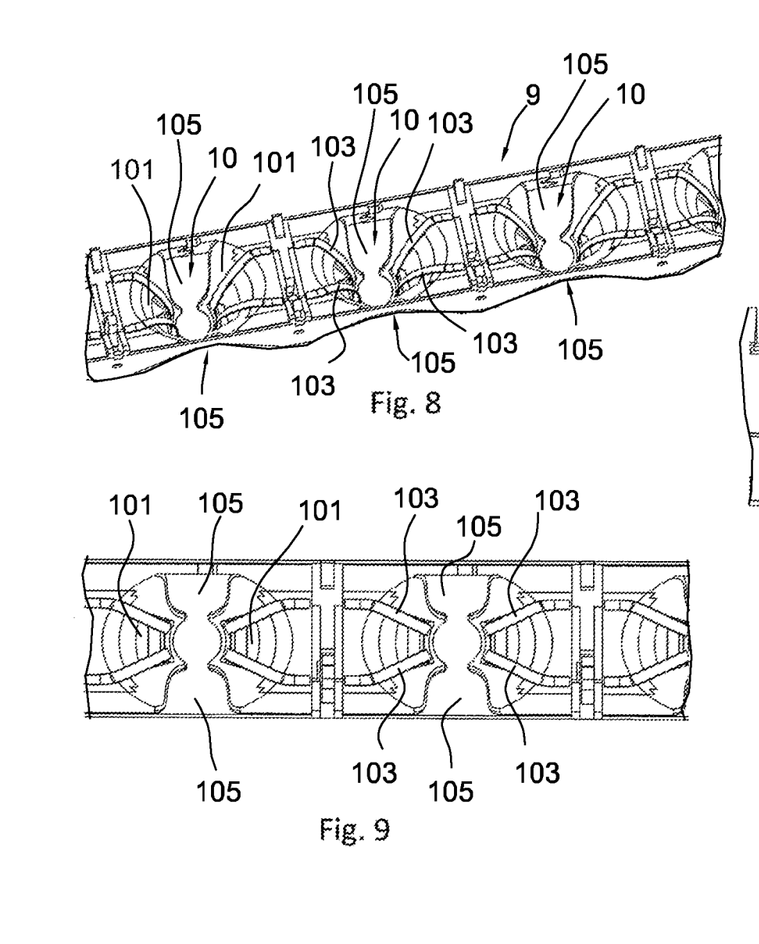
FIG. 8 shows in a view in perspective from above a part of a row of the conveyor of FIG. 1.
FIG. 9 shows in a top elevational view a part of a row of the conveyor of FIG. 1.
Figure 10:
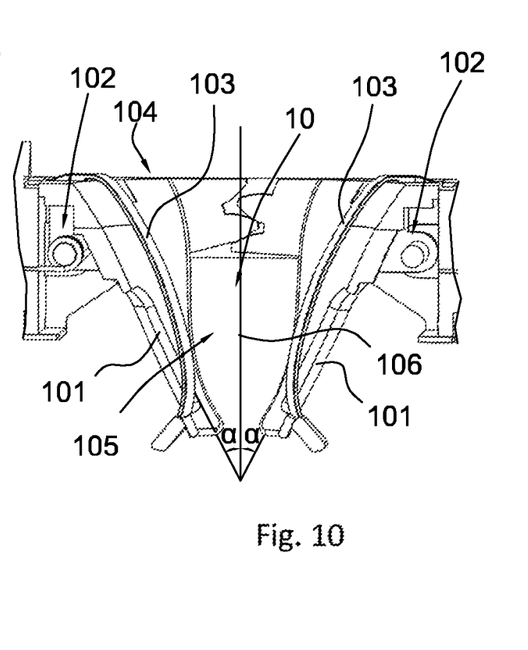
FIG. 10 shows in a cross sectional view an egg retaining pocket of the row shown in FIG. 8.

The stationary guiding track comprises successive guiding track sections 23, 24, which is best shown in FIGS. 5 and 6. The guiding track comprise at least a rectilinear guiding track section 24 parallel to the upper run 2 of the conveyor 1 and at least one curved guiding track section 23 parallel to the chain 6 at the corresponding head end 4, 5.

The curved guiding track section 23 comprises a first curved guiding surface 25 running parallel to the chain at the head end 4, 5. The first guiding surface 25 is radially outward of the guiding rolls 20 and engaged by the guiding rolls 20. A successive second curved guiding surface 26 running parallel to the chain 6 at the head end 4, 5, is engaged by the other guiding roll 21 as can be seen in FIG. 6.

Figures 3, 4:
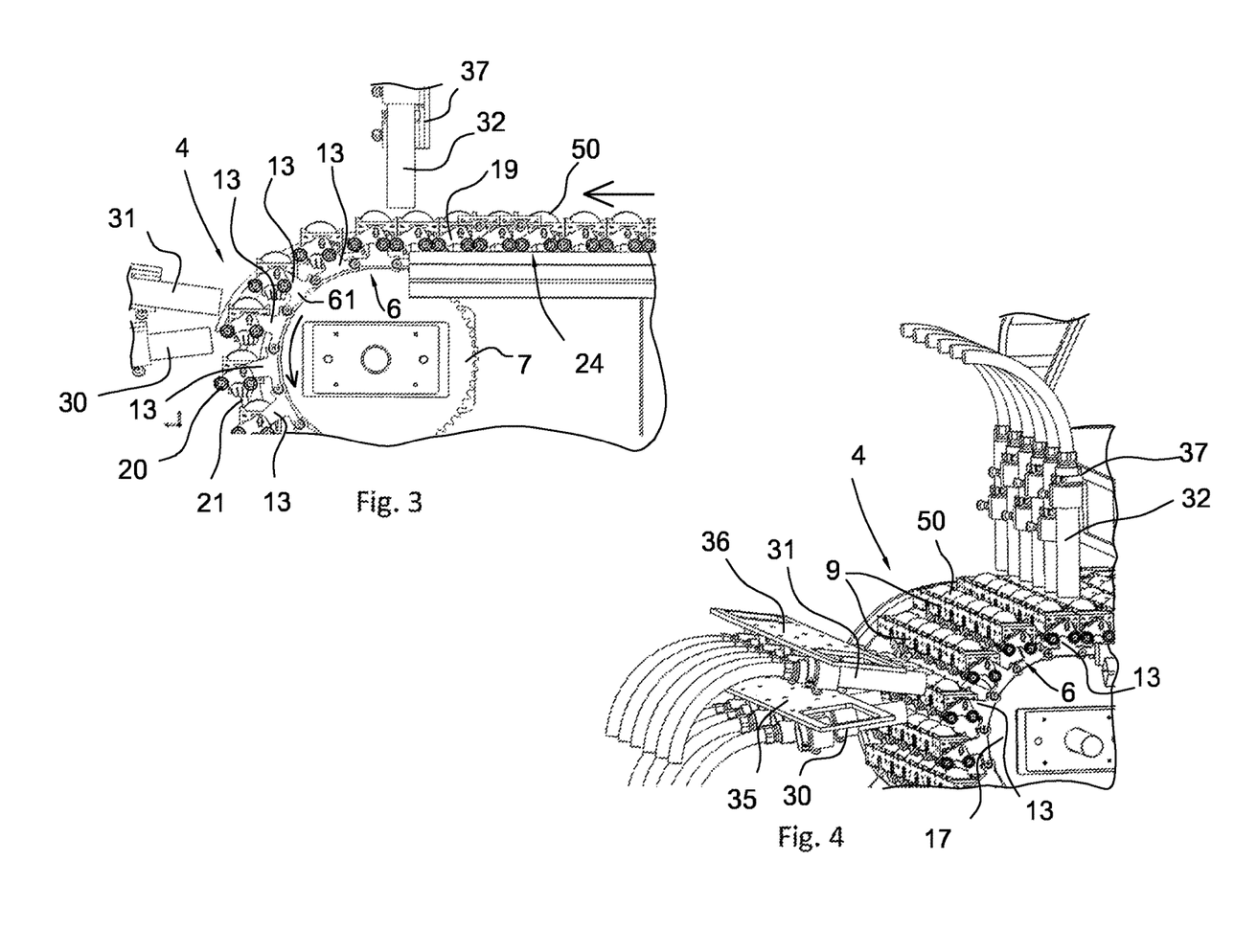
FIG. 3 shows a side elevational view of the egg printing system of the invention at a head section of the conveyor of FIG. 1.
FIG. 4 shows a view in perspective of the egg printing system of the invention at a the head section also shown in FIG. 3.

In FIGS. 3 and 4 is shown that for each lane two printer heads 30, 31 are positioned at the head section 4 of the conveyor 1. The printing heads 30 and 31 facing the corresponding lane 12 are directed to the side opening 105 in the pocket 10 to allow printing on the side surface area 51 of the egg 50.

The printing heads 30 corresponding to the respective lanes 12 are interconnected by a frame plate 35. The printing heads 31 corresponding to the respective lanes 12 are interconnected by a frame plate 36.

At the upper run 2 of the conveyor 1 a third printing head 32 is arranged per lane 12. The printing heads 32 are corresponding to the respective lanes 12 are interconnected by a frame plate 37.

Figure 11:
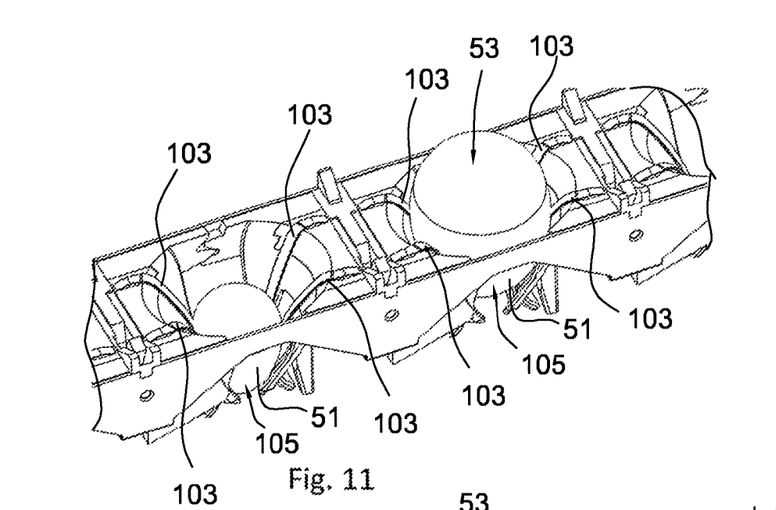
FIG. 11 illustrates a small egg and a large egg positioned in adjacent pockets in the row of FIG. 8.
Figure 12:
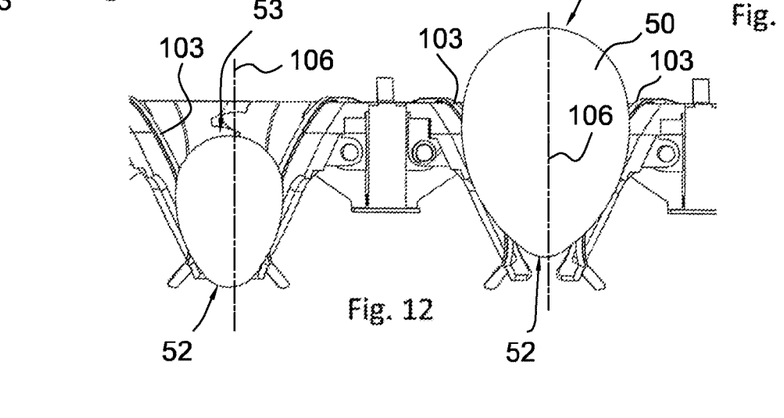
FIG. 12 shows the small egg and large egg in the pockets of FIG. 11, but in a cross sectional view.

The third printing head 32 is arranged to print on the end of the egg 50 that is located at the receiving opening 104 of the pocket 10. Eggs 50 having a rounded end 53 and a pointed end 52 and in general the eggs 50 are placed with said pointed end 52 down in the pockets 10 as is shown in FIGS. 11 and 12. Thus with the printing head 32 characters or figures are printed on the rounded end 53 of the egg 50.

In use when the chains 6 are driven by the motor, the rows of pockets 10 advance towards the printing heads 30-32 as is illustrated in FIG. 3. At the rectilinear guiding track section 24, both guiding rolls 20 and 21 are supported from below by the guiding track section 24. In this way the pockets 10 of the corresponding row 11, which are coupled to the lever arm 19 by means of the spindle 17 are kept in an upright position along the upper run 2 and possibly along the lower run 3 of the conveyor 1. The central axis 106 of the pocket 10 is thus kept substantially vertical.

When the row 11 of pockets 10 arrives at the head end section the guiding roll 20 will engage a curved surface 25. The shape of the curved surface 25 and the distance of the guiding roll 20 relative to the spindle 17 are adapted to each other such that in the top portion of the curve that each chain link goes through at the sprocket 7, the corresponding row 11 of pockets 10 is kept upright and stable.

At some point the other guiding roll 21 will engage a successive curved surface 26 which is located more radially inward relative to the other curved surface 25. The support given to the angled lever arm 19 is now taken over by the curved surface 26. The shape of the curved surface 26 and the distance of the guiding roll 21 relative to the spindle 17 are adapted to each other such that in the lower portion of the curve that each chain link 61 goes through at the sprocket 7, 8, the corresponding row 11 of pockets 10 is kept upright and stable.

Especially when inkjet printers are used, the distance of the printing head towards the surface to be printed is of great influence of the print quality. Due to the guiding structure as described above the pockets 10 are not allowed to tip over or to rock. This has an advantageous effect on the printing quality that can be achieved on the eggs 50.

The guiding structure results in that the pockets move comparable to a paternoster elevator. This results in that when the pockets 10 move vertically, i.e. at the end sections 4 and 5 of the conveyor 1, successive pockets 10 in a lane 12 will shift vertically with respect to each other. Thereby each pocket 10 is not shielded by the preceding pocket 10 in the lane 12 at a part of the trajectory with a vertical component. This can be best seen in FIGS. 3-5 and 7. At this part of the trajectory the printing head 30 for the respective lane 12 is advantageously positioned such that the eggs 50 in the pockets 10 can be printed on the side surface 51 (cf. FIG. 11) through the side opening 105.

Furthermore the egg pockets 10, and in particular the fingers 101 make a relatively large angle α (see FIG. 10) with the vertical. This has the effect that the difference of the vertical distance between the rounded end 53 of a small egg 50 (shown on the left in FIG. 12) and a large egg 50 (shown on the right in FIG. 12) is kept to a minimum. This is advantageous for printing eggs in a whole size range at their rounded end 53 with one printing head, without having to adapt actively the relative position between the printing head and the surface area of the egg 50 to printed.

However, a relatively large angle α reduces the stability of the egg 50 in the pocket 10, because the fingers 101 engage the egg more towards the pointed end 52, thus more below the centre of gravity of the egg 50. This is where the functionality of the elastic strips 103 comes forward: The elastic strips 103 engage the egg 50 also further towards the rounded end 53b and thus keeps the egg 50 stable in the pocket 10.

Figure 13:
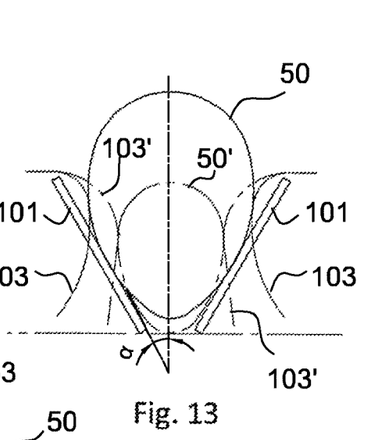
FIG. 13 illustrates schematically a large egg and a small egg in a same pocket.

The elastic strips 103 automatically adapt their shape to the shape and size of the egg 50, such that every egg is sufficiently supported laterally to keep it stable. In FIG. 13 is schematically shown a pocket 10 with a large egg 50 and a small egg 50' received in it. As can be seen the elastic strips 103 engage the large egg 50 higher than the same elastic strips, indicated by 103', engage the smaller egg 50'.

The shape of the pocket 10 and the provision of the elastic strips 103 results in that eggs 50 within a certain size range can simply be printed at their rounded end 53 with sufficient quality without complex adjusting arrangements to compensate for the size of the egg 50. The pocket 10 thus provides a simple and cost effective solution.

The invention claimed is:

1. An egg printing system comprising at least one printer having a printing head and an endless egg conveyor that is adapted to move eggs past the printer,
the egg conveyor including at least one endless element running around a set of rotational wheels rotating around respective rotational axes and a drive unit defining a conveying direction of the conveyor, said egg conveyor having an upper run and a lower run and head sections where the direction of movement of the endless element between the upper run and the lower run is reversed over one or more of said rotational wheels, wherein
the egg conveyor furthermore includes at least one lane of egg retaining pockets coupled to the endless element, said lane of retaining pockets in use moving in the conveying direction, each of said retaining pockets having a central axis and an upper receiving opening to receive an egg with a longitudinal axis of the egg generally aligned with said central axis of each egg retaining pocket, said pocket having a side opening at a side thereof facing in the conveying direction and/or in the opposite direction, leaving a side surface area exposed of the egg that is received in the pocket,
the egg retaining pockets are each coupled to the endless element by a bearing structure allowing rotation of the retaining pocket around a rotational axis that extends parallel to the rotational axes of said rotational wheels, allowing the retaining pockets to remain in an upright position in every position in the lane, and
the printer is positioned at one of the head sections of the conveyor with a printing head facing a corresponding lane being directed to said side opening in the pocket to allow printing on said side surface area of the egg.

2. The egg printing system according to claim 1, wherein, in case of a conveyor with a single lane, a retaining pocket of said lane, or, in case of a conveyor with multiple lanes, an adjacent retaining pockets of different lanes define a pocket row, wherein, the conveyor comprises carrying elements that carry pocket(s) of one row, and, in case of multiple lanes, the multiple pockets in a pocket row are rigidly connected to each other by the carrying element.

3. The egg printing system according to claim 2, wherein the bearing structure of each pocket row comprises a support arm on either lateral side of the conveyor, said support arm being positioned upright with respect to a circulating endless element and rigidly connected thereto, and wherein the bearing structure of said pocket row furthermore comprises at least one spindle rigidly connected to a carrying element which pivotally connects the carrying element to the support arms.

4. The egg printing device according to claim 3, wherein the carrying element is coupled to a guiding element, and wherein a stationary guiding track is provided adapted to cooperate with the guiding element so as to maintain the retaining pockets carried by the carrying element in the upright position during an entire circulation of the conveyor.

5. The egg printing device according to claim 4, wherein the stationary guiding track comprises successive guiding track sections including at least a rectilinear guiding track section parallel to the upper run of the conveyor and at least one curved guiding track section parallel to the endless element at a corresponding head end.

6. The egg printing device according to claim 5, wherein the guiding element comprises an angled lever arm and guiding rolls which are arranged on respective ends of the angled lever arm, and wherein a rotational spindle is fixed to the angled lever arm at an angle portion of the angled lever arm, and wherein the curved guiding track section comprises a first curved guiding surface running parallel to the endless element at the head end, which is engaged by one of said guiding rolls and a successive second curved guiding surface running parallel to the endless element at the head end, which is engaged by the other one of said guiding rolls.

7. The egg printing device according to claim 4, wherein the guiding element comprises an angled lever arm and guiding rolls which are arranged on respective ends of the angled lever arm, and wherein a rotational spindle is fixed to the angled lever arm at an angle portion of the angled lever arm.

8. The egg printing system according to claim 1, wherein the conveyor comprises multiple lanes.

9. The egg printing system according to claim 1, wherein the at least one endless element runs over one rotational wheel at each of the corresponding head sections.

10. The egg printing system according to claim 1, wherein the upper run and lower run are parallel.

11. The egg printing system according to claim 1, wherein the upper run is horizontal.

12. The egg printing system according to claim 1, wherein the endless element is a chain and each of the rotational wheels is a sprocket wheel.

13. The egg printing system according to claim 1, wherein the printer is an inkjet printer having an inkjet printing head.

14. The egg printing system according to claim 1, wherein at least one of the egg retaining pockets comprises moveable fingers to engage an egg, which can be moved between a retaining position, in which the egg is retained in the egg retaining pocket, and an releasing position, in which the egg is released from a lower end of the egg retaining pocket.

15. The egg printing device according to claim 14, wherein the egg retaining pocket comprises elastic elements for engaging the egg, said elastic elements being elastically deformable so as to adapt to its shape to shape and size of the egg and provide lateral support to the egg.

16. The egg printing device according to claim 15, wherein the elastic elements are elastic strips which are arranged on an inner side of the moveable fingers, wherein an upper end and a lower end of each elastic strip is fixed to at least one of the moveable fingers, and wherein a strip between said upper end and lower end are spaced apart from said inner side of the at least one moveable finger.

17. An egg printing method making use of an egg printing system comprising at least one printer having a printing head and an endless egg conveyor that is adapted to move eggs past the printer,
the egg conveyor including at least one endless element running around a set of rotational wheels rotating around respective rotational axes and a drive unit defining a conveying direction of the conveyor, said egg conveyor having an upper run and a lower run and head sections where the direction of movement of the endless element between the upper run and the lower run is reversed over one or more of said rotational wheels, wherein
the egg conveyor furthermore includes at least one lane of egg retaining pockets coupled to the endless element, said lane of retaining pockets in use moving in the conveying direction, each of said retaining pockets having a central axis and an upper receiving opening to receive an egg with a longitudinal axis of the egg generally aligned with said central axis of each egg retaining pocket, said egg retaining pocket having a side opening at a side thereof facing in the conveying direction and/or in the opposite direction, leaving a side surface area exposed of the egg that is received in the pocket,
the egg retaining pockets are each coupled to the endless element by a bearing structure allowing rotation of the egg retaining pocket around a rotational axis that extends parallel to the rotational axes of said rotational wheels, allowing the egg retaining pockets to remain in an upright position in every position in the lane, and
the printer is positioned at one of the head sections of the conveyor with a printing head facing a corresponding lane being directed to said side opening in the pocket to allow printing on said side surface area of the egg,
wherein eggs having a rounded end and a pointed end are placed with said pointed end down in the pockets, and wherein characters or figures are printed on the side surface area of the egg.

18. The egg printing method according to claim 17, wherein there is provided a second printer having a printing head which is positioned above at least one horizontal sections of the conveyor, and characters or figures are printed on the rounded end of the eggs.

* * * * *